US006863911B2

(12) United States Patent
Zimeri et al.

(10) Patent No.: US 6,863,911 B2
(45) Date of Patent: *Mar. 8, 2005

(54) BAKEABLE, LUBRICIOUS, SWEET, CREAMY, LOW-MOISTURE FILLER PRODUCTS AND PROCESS FOR PREPARATION

(75) Inventors: Jeanny Zimeri, Guatemala (GT); Chii-Fen Wang, Princeton, NJ (US); Zhen-Yi Yan, East Hanover, NJ (US); Harry Levine, Morris Plains, NJ (US); Louise Slade, Morris Plains, NJ (US); Weizhu Yu, Morris Plains, NJ (US); Julia Leigh DesRochers, Mahwah, NJ (US)

(73) Assignee: Kraft Foods Holdings, Inc., North Field, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/616,726

(22) Filed: Jul. 10, 2003

(65) Prior Publication Data

US 2004/0126464 A1 Jul. 1, 2004

Related U.S. Application Data

(63) Continuation-in-part of application No. 10/059,844, filed on Jan. 30, 2002, and a continuation-in-part of application No. 10/059,843, filed on Jan. 30, 2002.
(60) Provisional application No. 60/266,150, filed on Feb. 2, 2001.

(51) Int. Cl.$^7$ ................................................ A23G 3/00
(52) U.S. Cl. ...................... 426/94; 426/549; 426/601; 426/602; 426/658
(58) Field of Search ............................ 426/93, 94, 548, 426/549, 601, 602, 658, 659, 660

(56) References Cited

U.S. PATENT DOCUMENTS 3,198,637 A * 8/1965 Harris et al.
3,352,688 A * 11/1967 Messina
4,234,611 A * 11/1980 Kahn et al.
4,273,795 A * 6/1981 Bosco et al.
4,503,080 A * 3/1985 Brabbs et al.
4,670,272 A * 6/1987 Chen et al.
4,752,494 A * 6/1988 Tang et al.
4,774,095 A * 9/1988 Kleinschmidt et al.
4,855,155 A * 8/1989 Cavallin
5,366,750 A * 11/1994 Morano
5,376,399 A * 12/1994 Dreese et al.
H1395 H * 1/1995 Prosser
5,529,801 A * 6/1996 Morano
5,601,863 A * 2/1997 Borden et al.
5,612,078 A * 3/1997 Fileti et al.
5,935,634 A * 8/1999 Gamay et al.
6,146,672 A * 11/2000 Gonzalez et al.
6,280,782 B1 * 8/2001 Hahn et al.
6,472,005 B2 * 10/2002 Lingk et al.

* cited by examiner

Primary Examiner—Leslie Wong
(74) Attorney, Agent, or Firm—Thaddius J. Carvis; Thomas A. Harcoax

(57) ABSTRACT

A creamy product with a lubricious mouthfeel is bake-stable and suitable as a filler or topping for baked goods. In a preferred form, it comprises: at least 30% by weight of a discontinuous fat portion; at least 20% of a continuous aqueous liquid component for providing sweetness and stability, comprising liquid sugar and liquid polyol, wherein the combined weight of liquid sugars and liquid polyols amounts to from 40 to 95% solids by weight of the aqueous liquid component, and the continuous aqueous liquid component preferably contains less than 20% water. An optional suspended solids portion can be employed. The creamy product, wherein the moisture content is from 2 to 10% by weight of the total composition, and the combined amount of the sugar, polyol and other soluble solids comprises from about 25 to 65% of the total product and is sufficient to provide an $A_w$ of less than 0.5 for the total product, can be combined with a bakeable dough and baked.

22 Claims, No Drawings

BAKEABLE, LUBRICIOUS, SWEET, CREAMY, LOW-MOISTURE FILLER PRODUCTS AND PROCESS FOR PREPARATION

RELATED APPLICATIONS

This application claims priority based on U.S. Provisional Application 60/266,150, filed Feb. 2, 2001, and is a continuation in part of U.S. patent applications Ser. No. 10/059,843 and Ser. No. 10/059,844, both filed Jan. 30, 2002.

BACKGROUND OF THE INVENTION

The invention relates to a new class of filler compositions, which are lubricious in the mouth, yet bake-stable, shelf-stable, smooth-textured, sweet and creamy, and to products containing them and processes for preparing them. The lubricious, sweet, creamy products of the invention provide a number of product variations and combinations.

Foods having a sweet creamy filler are favorites that extend across generations and cultures. It would be desirable to have a filler composition, having a sweet flavor and a creamy, smooth and lubricious mouthfeel, that could be baked with a cookie or pastry shell, without adversely affecting the flavor or texture of either the filler or the accompanying baked portion. Once baked, the products should be shelf-stable.

The art has proposed a number of solutions to technical challenges in preparing bakeable fillings. For the most part, attempts to bake fillers have been unacceptable, and proposed formulations have compromised the desired properties by adding gelling agents or other materials that alter the desired texture or flavor or otherwise lessen the eating experience. Creamy fillers gain their texture in large part from fat, but fat has the tendency to melt, spread and separate from other ingredients in the formulation. For example, in U.S. Pat. No. 3,198,637, Harris et al. point out that conventional fillings cannot be applied to cookies and cakes prior to baking for several reasons, including discoloration of the filler and poor appearance and taste of the baked goods. The Harris et al. fillers are said to contain a "substantial proportion of shortening", but, in fact, were low-fat products, containing less than 25% fat in all of the examples. The formulations included 180 parts of a binding agent, such as flour or starch, for each 400 parts of sugar and each 40 to 175 parts of fat. The examples also contained water contents of 40 parts per 400 parts of sugar. Compositions like these would compromise the desired smooth, lubricious mouthfeel to achieve stability.

In another early attempt, Messina described a bakery filling in U.S. Pat. No. 3,352,688, which comprised an aqueous liquid, sugar, flavoring and a water-insoluble alginate. Fillings prepared according to this formulation were said to have freeze-thaw stability in addition to being stable to baking. However, the exemplified compositions contained no fat, thus seriously compromising a desired smooth, lubricious mouthfeel.

In U.S. Pat. No. 4,670,272, Chen et al. attempted to render cremes thermostable by formulating them to have low water activities ($A_w$'s) and dispersing a hydrocolloid in corn syrup, dispersing a modified starch and albumin in the colloidal dispersion, aerating the dispersion and cooking the dispersion. They point out that prior art high-moisture cremes with low $A_w$'s have been produced by adding various humectants, but assert that cremes produced in this manner have not been thermostable. The Chen et al.-exemplified cremes contain greater than 50% corn syrup and less than 20% fat, with moisture contents of 10 to 20% and $A_w$'s of 0.6–0.7. They point out that cremes known in the prior art generally have high moisture levels and high $A_w$'s (0.8–0.9) and suffer from the problem that, when they are combined with another food product having a lower level of moisture, such as a pastry, the disparity in moisture promotes the migration of water from the creme into the food product of lower moisture, causing a pastry, for example, to become soggy. Chen et al. state that the ability to maintain water activity values within their ranges at high moisture levels allows the texture to be better controlled for use in creme-filled pastries. Their formulations are, however, low in fat and contain significant moisture, making them less than desirable.

In a related teaching for fillings, U.S. Pat. No. 4,752,494 to Tang et al. describes a "thermostable cream" containing any one of a variety of flavors in a formulation containing $Ca^{++}$ ions, caseinate ions and corn syrup, with maltodextrin and lactose in place of some of the corn syrup of Chen et al. The product is said to withstand baking and be shelf-stable. Various so-called "water binders" are employed to provide an $A_w$ of from about 0.6 to 0.8. While the description would permit up to 35% fat, the only example shows no fat, which, in combination with the gelling system, would compromise a smooth, lubricious mouthfeel.

In U.S. Pat. Nos. 5,366,750 and 5,529,801, Morano points out that products of the type produced by Tang et al. suffer from a common problem in the art, when dealing with water-soluble gelling agents, whether protein- or carbohydrate-based. He argues that these products require significant water contents to hydrate the gelling agent, which one would like to avoid, and proposes the use of an ultra-high surface area cellulose that is able to hydrate in a hydrophilic liquid phase comprised of an edible polyol humectant. Morano also reduces the fat content to less than 15%. Thus, this composition requires the presence of a particular form of cellulose to avoid the need for water, and fats are largely avoided. It would be desirable to meet the challenge of providing a bakeable filler, without resorting to adding cellulose or decreasing fat.

A number of patents describe reduced-moisture foods having $A_w$'s of less than 0.85, and often lower than 0.70. As a practical matter, reducing $A_w$ in accord with known teachings can provide microbiological stability. However, organoleptic and rheological criteria for foods are easily compromised. There is a technical challenge in modifying a sweet food such as a creme filling, with a considerable fat content, such that it becomes stable to baking, i.e. bakeable, without sacrificing its flavor or creamy texture. Once baked, a product must maintain its texture. The food must also retain its flavor, and it must not adversely affect a copackaged baked dough such as is found in cookies, crusts, pretzels, crackers or puffed snacks, such as creamy filled puffed snacks or the like, in terms of taste, texture or color. This means that the baked dough portion of the composite product must maintain a fresh, e.g. crisp, texture. It must not become soggy due to the migration of moisture from the filling or oil-soaked due to the release, i.e. so-called "oil-out", of oil from the filling.

U.S. Pat. No. 4,503,080, to Brabbs et al., specifically addresses the maintenance of textural contrast between a crisp outer cookie dough and a chewy inner cookie portion. Their solution to the problem utilizes the concept of $A_w$ and selection of various sugars to achieve what the inventors refer to as cookies having a storage-stable plurality of textures. A central chewy dough portion is prepared from flour, shortening and water mixed with sugars containing a crystallization inhibitor, such that it retains a chewy texture when baked with a crisping outer dough. The doughs are baked to final $A_w$ values of less than 0.8, e.g. from 0.3 to 0.55. The soft, central dough is, however, not a crème, and it does not resist flow during baking. The outer cookie dough encapsulates the interior dough to prevent it from running. These teachings are not seen to address the problems facing the art in the provision of crème fillers having a lubricious mouthfeel, due to significant fat contents, yet requiring bake- and shelf-stability.

Fats will typically run and separate from crème-type products when heated, especially as needed for baking. The issue of oil release is a particular problem, as it affects the texture of baked dough, as well as its flavor and color. Moreover, when oil is released from a filler, the flavor and texture of the filler are also altered. In U.S. Pat. No. 5,935,634, Gamay et al. address this problem in the context of a low-$A_w$ cheese product containing 40 to 70% cheese. Gamay et al. point out in their discussion that they faced a dilemma, in that binding free water may also contribute to fat separation and dry consistency. They say that they addressed this by allowing merely sufficient water to support the resulting emulsion without fat separation, yet their water contents were very high. The examples reporting satisfactory results included over 34% water and $A_w$ values of over 0.80, and still contained less than 27% fat and less than 10% sugars. Accordingly, their results would not translate well to the provision of crème fillers having significant fat contents, yet exhibiting bake- and shelf-stability.

In U.S. Pat. No. 5,376,399, Dreese et al. address the technology of cremes, but describe low-$A_w$, reduced-fat cremes in which a high-solids saccharide syrup having dispersed therein a fragmented granular starch hydrolysate reduces fat. The cremes are prepared by making a premix of the granular starch hydrolysate and high-solids saccharide syrup, and then fragmenting the granular starch hydrolysate in the premix. The amount of water in the creme is less than about 46% by weight, and preparation of the fragmented granular starch hydrolysate entails mechanical disintegration. The examples show cremes, some with fat, but only at 10%. While $A_w$'s are relatively low, the water contents of 15 to 30%, along with the low fat contents, will seriously compromise the provision of lubricious, bakeable cremes.

Also, relating to low-fat products, U.S. H1,395, to Prosser, describes a food composition said to be useful as a peanut spread. It has a reduced level of fat and/or oil, due to the replacement of peanut butter with other materials, exemplified as added water of greater than 29% and the materials necessary to stabilize it. The composition is said to be a macroscopically homogeneous blend of a peanut component and an aqueous phase associated with a fragmented granular starch hydrolysate. Again, the formulation does not meet the criteria of a bake-stable, lubricious creme composition.

While related to fillings for dough products, Hahn et al., in U.S. Pat. No. 6,280,782, describe non-emulsion-based, moisture-containing fillings comprising at least two $A_w$-impacting ingredients. The $A_w$ of the fillings can be adjusted, e.g. by the incorporation of moisture, so as to be substantially equivalent to the $A_w$ of the dough into which the filling is to be incorporated. By reducing the differential in $A_w$'s between the dough and the filling, one can reduce or eliminate moisture migration between the filling and the dough. The compositions can contain, for example, a hydrocolloid gum in an amount of from about 0.1% to about 5%, from about 20% to about 60% shortening, a sugar such as dextrose in an amount of from about 10% to about 50%, a liquid sweetener in an amount of from about 1% to about 35%, and optionally, ethanol or a polyol such as glycerol, propylene glycol, sorbitol, xylitol or erythritol. These formulations contain 20 to 60% fat and 10 to 50% sugars, to achieve exemplified $A_w$'s of above 0.725, and are not emulsions. Therefore, these compositions cannot fill the need in the art for bakeable, lubricious, sweet, creamy, low-moisture fillers.

Fileti et al., in U.S. Pat. No. 5,612,078, employ polyols and emulsifiers to reduce the fat content of filler cream compositions for reduced-fat sandwich cookies. The cremes contain more than 60% sugar and less than 30% fat and are produced by replacing a substantial portion of the filler cream fat with a polyol, preferably glycerol. Exemplary replacement ratios may range from about 0.85 to about 1.6 parts by weight of polyol per part by weight of oleaginous composition or fat replaced. These compositions cannot fill the need in the art for bakeable, lubricious, sweet, creamy, low-moisture fillers.

In another low-fat product, U.S. Pat. No. 4,855,155 to Cavallin describes an oil-in-water emulsion of quarg or yoghurt, milk, fat, sugar, starch and water, wherein the product is prepared, in part, by homogenizing, pasteurizing and then aerating the resulting mixture. The $A_w$ values are in excess of 0.90, and water contents are from 46 to 48%, with low fat contents of only 25 to 27%. Clearly, these formulations are not related to the objectives of achieving bakeable, lubricious, sweet, creamy, low-moisture fillers.

In U.S. Pat. No. 6,472,005, Lingk et al. describe a savory snack product with two layers of a whipped and baked savory sponge and a filling in-between. The sponge is baked prior to adding the filling, which is a water-in-oil emulsion with $A_w$ of between about 0.6 and 0.85. In the example, the filling is prepared from an aqueous phase comprising 25% maltodextrin, 2% sugar, 5.5% tomato extract, 11% water, and minor ingredients such as salt, aroma, and lactic acid, representing 50% of the composition. The other 50% is the fat phase, comprising 49.5% of palm oil plus an emulsifier. The fat is melted and mixed with the emulsifier, and said fat phase is emulsified with the aqueous phase and whipped to an overrun of 50%. Because the emulsion is fat-continuous, the fat would run during baking, if added to the sponge prior to filling.

In U.S. Pat. No. 6,146,672, Gonzalez et al. describe spreadable, water-in-oil emulsion fillings. These fillings can be sweet, but as with Lingk et al., these compositions will spread during baking, as the fat melts. They comprise water, a fat phase comprising a fat with a high solid fat index (SFI), or a combination of fats with high and low SFI's, a mixture of emulsifiers with high and low hydrophile-lipophile balance (HLB) values, and a stabilizer. When dough products are filled with the emulsion filling, they are said to exhibit enhanced shelf life and, when baked, to produce finished products with enhanced overall product quality. These fillings can be sweet, but as with Lingk et al., these compositions will spread during baking, as the fat melts.

In U.S. Pat. No. 4,774,095, Kleinschmidt et al. describe filling-containing, dough-based products, in particular fruit-filled cookies. These products comprise a crumb or dough and a low-$A_w$ filling associated with this crumb or dough. The filling comprises an aqueous phase having sugar dissolved therein and a thixotropic, cohesive network of fibrils and microfibrils dispersed therein, to control flow during baking a dough portion. The network of cellulosic fibrils and microfibrils functions as a flow-control agent that permits the filling to be co-baked with the dough forming the crumb. The aqueous phase comprises from about 5 to about 50% by weight of an edible polyol humectant, dissolved in said aqueous phase and selected from the group consisting of glycerol, sorbitol, propylene glycol and 1,3-butanediol. It would be desirable, however, to provide a composition that achieved a lubricious texture and mouthfeel, due to a high fat content, without suffering from the problems normally associated with such during baking.

In U.S. Pat. No. 4,234,611, Kahn et al. describe microbiologically stable foods that are usually kept at freezer temperature, but which can be maintained at room temperature or refrigerator temperature for an extended period of time, and are prepared by controlling their sugar/fat content. These compositions, however, have significant water contents, which are greater than their fat contents. An example of such a composition is a pudding containing 30% water, 50% sugar, 18% fat, and minor but effective amounts of alginate, stabilizer, emulsifier and flavoring. This product is semi-soft at freezer temperature and possesses the microbiological stability requisite for storage at room temperature for an extended period of time without spoilage. Another example is a butter creme having 25 to 42% water and 10 to 30% fat. The $A_w$'s are usually about 0.75 to 0.90, which may be effected by the use of polyols. The products are not intended to be bake-stable in association with a dough, to achieve a product having shelf-stable textural distinctiveness.

The problem of spread is not limited to non-emulsified products or water-in-oil emulsions. Oil-in-water emulsions, as described by Bosco et al. in U.S. Pat. No. 4,273,795, also spread readily when heated. These spreads can be flavored as desired and are solid at 40° F., preferably at 70° F. The spreads comprise from 10 to 30% of a dispersed fat, a continuous aqueous phase containing an emulsion stabilizer, and an emulsifier system comprising both lipophilic and hydrophilic emulsifiers. These emulsions remain stable after heating.

With all of the prior art attempts to provide stability at various stages of product preparation and in various types of products, it becomes clear that, while the terms "intermediate-moisture foods" and "shelf-stability" may relate to microbiological stability and to foods having some other set of characteristics, they do not relate or provide direct answers to the problems confronted in this application. As a practical matter, the property of "shelf-stability" requires more than microbiological stability. Indeed, there are a number of organoleptic and rheological criteria that must be met, before a product can be considered "shelf-stable". There is a technical challenge in modifying a sweet food such as a sweet, lubricious creme filling, such that it becomes stable to baking, i.e. bakeable, without sacrificing its flavor or creamy texture.

Thus, there remains a need in the art for bakeable, lubricious, sweet, creamy, low-moisture filler products and processes for their preparation.

DISCLOSURE OF INVENTION

Accordingly, it is an object of this invention to provide a sweet, bakeable, lubricious, smooth-textured, creamy product.

It is a more specific object of this invention to provide a sweet, bakeable, lubricious, smooth-textured, creamy product that has substantial fat to provide a strong contribution to mouthfeel, a high sugar content for sweetness and body, a low moisture content, and can be subjected to heating followed by cooling at room temperature, while maintaining an extremely creamy, lubricious character throughout processing and storage thereafter.

It is another object of the invention to provide fillers that retain stability and preferably can become more stable upon heating, but retain their smooth and lubricious mouthfeel.

It is another and specific object of the invention to provide a process that enables processing a normally unbakeable, fatty filling or the like and modifying it, such that it becomes bakeable without sacrificing its flavor or a sweet, lubricious, creamy texture, as expected for fillings of this type.

It is yet another and more specific object of the invention to provide a process that enables processing sweet, lubricious, creamy fillings and the like and modifying them to make them bakeable, without sacrificing their flavor or a creamy texture.

It is yet another and specific object of the invention to provide a process that enables adding a lubricious, creamy filler to an unbaked dough and baking the resulting composite to provide a product having suitable creamy filler and baked dough with crisp texture, with shelf-stability, wherein the filler remains smooth, lubricious, and creamy with good flavor, and the baked dough maintains its crisp texture, not becoming soggy due to the migration of moisture from the filler or oil-soaked due to the release of oil from the filler.

It is yet another object of the invention to provide a range of creamy products of the sweet type, which can be provided in a variety of product forms, both baked and unbaked, and adaptable for other uses by the consumer.

It is a more specific object of the invention to provide a shelf-stable, lubricious, creamy, sweet product that can be added to dough prior to forming or baking, and to provide processes for preparing the creamy product and the combined dough and creamy products.

These and other objects are realized by the present invention, which provides both a process for preparing shelf-stable sweet, e.g., lubricious, creamy products, and the products, baked and unbaked, having improved properties.

In one aspect of the invention, a lubricious, smooth-textured, bakeable and shelf-stable, creamy product is provided. The lubricious, creamy product comprises: at least 30% by weight of a discontinuous fat portion; at least 20% of a continuous aqueous liquid component for providing sweetness and stability, comprising at least 15% liquid sugar and at least 9% liquid polyol, wherein the combined weight of liquid sugars and liquid polyols amounts to from 40 to 95% of the weight of solids in the aqueous liquid component, and the continuous aqueous liquid component contains less than 30% water, preferably less than 20% water; and up to about 30% of an optional suspended solids portion; wherein the moisture content is from 2 to 10% by weight of the total composition, the weight ratio of fat to water is greater than 4:1, the weight ratio of fat to sugar is greater than 1:1, and the combined amount of the sugar, polyol and other soluble solids comprises from about 25 to 65% of the total product and is sufficient to provide an $A_w$ of less than 0.5 for the total product.

In another aspect of the invention, a bakeable dough is combined with a sweet, lubricious, smooth-textured and shelf-stable product as defined above.

In another of its several aspects, the invention provides a process for preparing a sweet, lubricious, smooth-textured, bakeable and shelf-stable product.

In another aspect of the invention, a process is provided for preparing a sweet, lubricious, smooth-textured filling and dough composite product comprising at least one discrete region of a filling as described above and at least one discrete region of a dough, preferably baked to a crisp texture.

In yet another aspect, the invention provides sweet products as described above, packaged in sealed containers of either rigid or flexible construction. In one embodiment, a flexible plastic tube is provided for squeezing the sweet, creamy product onto or into a cooked or raw food product, for eating as is or after cooking.

Other preferred aspects of the invention will be detailed below.

DETAILED DESCRIPTION OF THE INVENTION

The invention will be described below with specific reference to preferred lubricious, sweet, creamy filler formulations, and composite baked dough and filler products, and preferred processing techniques. However, it will be clear to the experienced food scientist that the principles that enable improvements in these will apply to other products as well.

The invention provides a process that enables modifying normally unstable, sweet foods such as creamy fillings to render them stable to the heat of baking, without sacrificing their flavor or creamy texture. The terms "bakeable", "bake-stable" and "stable to baking" are used interchangeably and refer to a minimal heat stability of a sweet filling within a composite baked dough and filling product, such as a filled cookie, cake, pastry, cracker, pretzel, crust or puffed snack, to maintain suitable homogeneity and rheology and to remain acceptable as a filling, without significantly degrading the baked dough. Bakeable fillings will not experience significant oil separation, maintaining substantially all of the oil in the dispersed phase, without spreading to surrounding dough or other food portions. It is an advantage of the invention that the creamy fillings described herein can contain crisp particulate inclusions to provide a filler with suspended pieces of cookie, crust or the like. This is facilitated because the filler is self-supporting after baking it for 10 minutes at 400° F., so it can be used in applications where pieces of crust or nuts are suspended in the filler.

Among the snack products that can be successfully prepared according to the invention are starch-based snack products, such as cream-filled balls, or cookie, cake, pie or pastry dough, and the like. Products such as these can be prepared by sheeting, cutting and/or coating methods, or they can be coextruded as an enrobed "rope" of the filling within a "rope" of dough that is fully baked, during forming by extrusion or thereafter. In this context, the terms "bakeable" and "bake-stable" refer to rheological and homogeneity stability at filler composition temperatures typically encountered during baking of a dough portion. Any suitable technique can be employed for forming a composite of a dough and a filling.

In the context of this description, the term "bake-stable" means that the filler composition is resistant to degradation at temperatures of at least 115° C. and will desirably remain stable at temperatures up to about 150° C., when heated with a dough layer in direct contact with the heat source. Heating includes conventional baking, such as by convection and infrared, as well as extrusion, oil frying, and the like. Since fillers may be insulated to an extent from actual baking (e.g., heating) temperatures by surrounding dough, a filler that is stable up to a given temperature, such as 115° C., is suitable for use in a composite filled dough product that may be subjected to substantially higher baking temperatures than 115° C. Such temperatures would be encountered, for example, in a filled extruded product prepared using an extrusion process, wherein the temperature of the extruder at the tip of the extruder die could reach 155° to 160° C., or possibly higher. Such temperatures are sufficient to bake the unbaked dough surrounding the filler. That is, those temperatures are sufficient to gelatinize the starch, which typically would be in the casing surrounding the filler, to an extent that ensures that raw flavor notes in the starch would be eliminated or minimized. Heating includes conventional baking, such as by convection and infrared, as well as extrusion, oil frying, and the like.

The filling products of the invention are "lubricious", meaning that they have a slippery mouthfeel due to the presence of significant fat content. The mouthfeel is not gummy or filmy, as often occurs when gums and fillers are used to replace fat in a composition. An expert panel of tasters is able to distinguish a lubricious mouthfeel from one that is simply smooth and free of graininess.

The filling products of the invention provide unique combinations of often-competing properties of being sweet, lubricious, smooth-textured, bakeable and shelf-stable. They achieve these properties by providing a unique multi-phase combination, including a sweet aqueous liquid phase and a dispersed fat phase. In some formulations, such as those producing peanut butter or like fillings, a solids phase, preferably containing suitable undissolved but water-dispersible solids, will be present in very significant amounts. Before we describe the composite baked dough and filler products of the invention, we will describe the composition and preparation of the filler compositions that make them possible.

Sweet, Lubricious, Creamy, Bakeable Filler Compositions

In each aspect of the invention, the lubricious, creamy product comprises a fat portion of a composition and in an amount effective for providing a lubricious mouthfeel. To achieve this desired effect and to make the filler bakeable, it is necessary to utilize sufficient fat and to protect it from the effects of heat. Typical water-in-oil emulsions of the type utilized in margarine will break as solid fat melts. The same is true of many oil-in-water emulsions. According to the invention, the fat will be present in an amount of at least 30% by weight of the creamy product. Typical fat contents will be within the range of 35 to 65%, and more preferred amounts will be within the range of from about 40 to 55%.

A continuous aqueous liquid component is important for maintaining the stability of the fat phase. The aqueous liquid component must be of a composition effective to provide a desirable sweetness and to stabilize the fat during baking and the filler during storage and contact with a baked dough component. The aqueous liquid component will comprise sufficient water to provide a smooth texture to the component, sugars of suitable type and in suitable amounts to provide a sweet taste and necessary stability, and polyols for stability in addition to that provided by the sugars.

The filler compositions of the invention are oil-in-water emulsions, containing water in a continuous aqueous phase. The water is sufficient in amount to provide a smooth texture to the component, but will be limited to the extent possible. The water is present in an amount of up to about 30% of the aqueous phase and typically comprises less than 10% of the total product. Preferred water contents are less than 20% of the aqueous phase and less than 8% of the total product. The use of suitable sugars and polyols and, optionally, non-gelling proteins increases the viscosity of the continuous aqueous phase and decreases its temperature sensitivity, to the extent that it can be effectively stabilized, and an enclosed fat component can be effectively stabilized therein, at elevated temperature. The weight ratio of fat to water is greater than 4:1, and the weight ratio of fat to sugar is greater than 1:1.

Sugars are essential to the products, from both taste and stability standpoints. It is therefore necessary to select sugars of suitable type and to use them in effective amounts to achieve the objects of the invention. Total sugar content should be in an amount of at least 10%, and preferably from 25 to 65% of the total product. Among the suitable sugars are sucrose and various corn syrups, as well as polydextrose. For blander flavor, hydrogenated polydextrose (more correctly termed a polyhydric alcohol when fully hydrogenated) can be employed. Sucrose is a preferred sugar, due to its clean, sweet taste and its ability to provide soluble solids to add body and enhance stability. However, it has been found to be important that, when using sucrose, sufficient crystallization-reducing sugars also be present to inhibit the tendency of sucrose to crystallize at the low moisture contents involved in the practice of the invention. Among the preferred crystallization-inhibiting sugars are monosaccharides, such as fructose and dextrose, as available in corn syrups of various DE values, e.g. preferably at least 25, high fructose corn syrup, fructose syrup and invert sugar. It is believed to be important that the sugars should be selected to always contain monosaccharides at greater than a 1:1 mole ratio to sucrose. It is an advantage of the invention that the liquid aqueous phase maintains a grain-free mouthfeel, yet stabilizes the fat and itself from separation, throughout a temperature range of from at least 15 to 115° C., and preferably from 5 to 150° C. Liquid sugars are desirably employed at levels of at least 15% by weight of the continuous aqueous liquid component, and can be employed to the extent that the total moisture of the component does not exceed 20%. or the total product moisture does not exceed 10% by weight.

When the above criteria are met, the sugars are maintained in solution to a great extent at low moisture contents, or are otherwise maintained suspended or in a supersaturated state that resists crystallization and graininess. With these as guidelines, the person skilled in the art is free to select sugars from among those known to be useful for food formulation. Thus, the term "sugar" is to be understood as meaning any of a number of useful saccharide materials. Included in the list of useful sugars are the monosaccharides, disaccharides and polysaccharides and their degradation products; e.g. pentoses, including aldopentoses, methylpentoses, keptopentoses, such as xylose and arabinose; a deoxyaldose such as rhamnose, hexoses and reducing saccharides such as aldohexoses including glucose, galactose and mannose; ketohexoses such as fructose and sorbose; disaccharides such as lactose and maltose; non-reducing disaccharides such as a sucrose, and other polysaccharides such as dextrins and raffinose; and hydrolyzed starches that contain oligosaccharides as their constituents. A number of sugar syrups, including corn syrups, high fructose corn syrups, molasses, and the like, are common sources, as are various granular and powdered forms. The liquid sugar component can be added as an aqueous solution, or in dry form and hydrated by added water to form the continuous aqueous liquid component.

The liquid aqueous phase of the lubricious, sweet filler compositions of the invention contain at least 9% of a liquid polyhydric alcohol (polyol). The polyol has a number of functions, including preventing crystallization of dissolved solids during temperature cycling and providing a controlled $A_w$ in the product. The polyol is employed at a level effective to meet the objectives of the invention. Suitable for use, also as a plasticizing agent, are any of the normally liquid, edible di- or trihydric alcohols or sugar alcohols or other polyhydric alcohols of suitable flavor and effective for this purpose. Prominent among these are glycerol and sorbitol, but others of this class and mixtures of these can be employed, for example hydrogenated starch hydrolysates and hydrogenated polydextrose. (Hydrogenated polydextrose tends to have a cleaner taste than polydextrose per se and is described, for example, in U.S. Pat. No. 5,601,863, and can be purchased under the trademark Litesse® Ultra from Danisco Sweeteners.) It has been found that, due to its highly effective plasticizing effect and its flavor, glycerol is a preferred material. As with the liquid sugar component, the polyol can be added as a liquid or aqueous solution, or in dry form and hydrated by added water to form the continuous aqueous liquid component. The combined weight of liquid sugars and liquid polyols desirably amounts to from 40 to 95% by weight of the aqueous liquid component.

In addition to the sugars and plasticizing polyol, the aqueous liquid also contains sufficient other dissolved, water-soluble materials capable of building viscosity in the liquid phase and/or lowering the $A_w$ to deter microbial growth in the composition. Among these are carbohydrates such as polydextrose and salts such as sodium chloride and potassium chloride, which are the preferred $A_w$-lowering materials. Polydextrose can be employed at levels up to about 35% by weight of the total food product, e.g. from about 2 to 20%. Polydextrose is highly soluble in water, and is preferably employed in solubilized form. However, where its bulking capability is needed in a particular formulation, up to about 5% can be unsolubilized. It is typically added as a concentrated aqueous solution (70 or 80%), but can be added dry and blended into at least a part of the aqueous ingredients and dissolved. Not all of the added polyol need be liquid, as long as the criterion is met that the combined weight of liquid sugars and liquid polyols amounts to from 40 to 95% by weight of the aqueous liquid component.

To achieve the objectives of the invention, the compositions have moisture contents of from 2 to 10% by weight. The combined amount of the sugar, polyol and soluble solids comprises from about 25 to 65% of the total product, and is sufficient to produce an $A_w$ of less than 0.5 for the total product. The products are characterized by extremely low $A_w$ values, without being sensitive to temperature extremes within the range of from 5 to 115° C. The composition, including the soluble solids, is effective in producing for the total product an $A_w$ of less than 0.5.

It has also been found to be an advantage of the invention that up to 20% of the total composition can comprise solid flavor ingredients, which can be present as undissolved, dispersible solids. These solid flavor ingredients can be water- and/or fat-dispersible and of sufficiently small particle size to provide the proper flavor release and a texture consistent with the desired flavor. For example, the mouthfeel for peanut butter-type products should be smooth and creamy, and the added solids can take the form of peanut flour, peanut butter or other peanut-derived materials. Preferred products of the invention have a lubricious, smooth mouthfeel and a flavor release that endures until the palate is essentially clean. It would be unacceptable for the flavor to be completely released during the dissolution of only the liquid phase in saliva in the mouth, leaving an unflavored portion of undissolved solids. Importantly, the texture should be viscous enough to be maintained both before and after any heat treatment such as baking. The particle size of the solid-phase ingredients is important to the final texture. The particle size is best determined organoleptically and should be below the threshold at which graininess is perceived. Undissolved sugar or polyol solids can also provide benefit, in that they tend to dissolve during heating and thereby further stabilize the composition against high-temperature breakdown. Upon cooling, these dissolved sugars and polyols tend to stay in supersaturated solution or be suspended as fine crystals, due to the presence of monosaccharides and polyols in combination. It is an advantage of the invention that the creamy fillings described herein can also contain crisp particulate inclusions to provide a filler with suspended pieces of cookie, crust or the like. These inclusions provide textural interest as compared to the other dispersible solids and typically have particle sizes in the range of from about 0.05 to about 0.5 inches, maximum dimension. The inclusion of particulates of this nature is facilitated because the filler is self-supporting after baking it for 10 minutes at 400° F., so it can be used in applications where pieces of crust or nuts are suspended in the filler.

The presence of a distinct solids component phase is desirable, when it is dispersible in the aqueous and/or fat phase, especially when it promotes stability. It typically comprises, for example, up to about 25% of the total weight of the product. Desirably, it contains a flavor, such as a peanut flavoring material, in a significant amount, e.g., sufficient to comprise at least 5%, preferably at least 8%, and most preferably at least 15% of the total weight of the product. Peanut flour is a preferred insoluble solid, from the standpoint that it has both hydrophilic and lipophilic properties. This is a desirable combination of properties for solids added to the formulations of the invention. Peanut butter is likewise effective, as are other dried food solids having strong affinities for either one or both of the oil and aqueous phases. In addition to the peanut flavoring material, such as peanut flour or peanut butter, a flavoring material may include binders, stabilizers, carriers or fillers to enhance its distribution and mixing in the formulation. As another significant consideration of the invention, it has been found to be important to have solid flavor ingredients present as undissolved solids of sufficiently small particle size to provide the proper mouthfeel, flavor release and texture consistent with the sweet flavor.

The use of undissolved solids in the above manner, in accord with the invention, results in fillers that can provide added stability against fat separation and spread at elevated temperatures required for baking. Fillers that lack stability at a given temperature may become hard and/or dry, may oil-out, spread and perhaps brown. It is an advantage that the fillers of the invention tend to retain stability and preferably can become more stable upon heating, but retain their smooth and lubricious mouthfeel. While some increase in filler viscosity is acceptable, dramatic increases of, e.g., ten-fold or more are indicative of poor bake stability and do not occur according to the invention. The complex viscosity of the unbaked creamy, sweet filler product is typically within the range of from about 300 to about 5,000 Pa.s, e.g., from about 400 to about 2,000 Pa.s, as measured at 25° C. at a frequency of 10 rad/sec, from 0.01 to 1% strain. Such viscosity measurements may be performed, for example, using a strain-controlled rheometer called an ARES (Advanced Rheometer Expansion System, TA Instruments, Piscataway, N.J.). Importantly, however, for products that are to be formed as sandwiches, the filler component should have sufficient viscosity in an unbaked condition to resist flow due to gravity or other moderate applied forces.

The aqueous phase advantageously contains a minor amount, e.g., from about 0.5 to about 15%, preferably from 1 to 9%, based on the weight of the phase, of a water-soluble protein such as whey, in the form of whey protein concentrate or isolate, which has the ability to denature during heating, to provide added binding and body to the product, without causing it to gel or become lumpy or grainy. When processing compositions containing this protein, an increase in viscosity within the above ranges may be observed, but the effect is not sufficient to produce a clean-cutting gel. Thus, the effect is to stabilize the viscosity, not congeal the liquid or cause it to become lumpy, as occurs with some other heat- and/or chemically setting gel systems.

The fat phase is typically employed in an amount of at least 30%, preferably from 35 to 55%, and most preferably from about 40 to 50% by weight of the creamy product, wherein the fat phase is a dispersed phase. The fat provides a desirable mouthfeel that is expected of filler products, but is often missing in fillers that are heat-set, gelled or otherwise highly stabilized. The fat phase of the products of the invention is present within the composition in a form that permits release in the mouth, but surprisingly does not migrate from it into a baked dough material. And, it is neither encapsulated, which would make it unavailable to the palate, nor expressed from the filler during heat-processing. Thus, the product of the invention is imbued with a very acceptable mouthfeel, without causing taste or stability problems in the overall formulation. The fat is emulsified in a stable form. One criterion for stable emulsions is the fat droplet size. Desirably, the mean particle size for fat droplets can be 4 $\mu m \pm 2$ $\mu m$ (in some cases, as small as 2 $\mu m \pm 1$). Approximately 60–70% of the distribution will desirably be at the mean, and 95% is less than 10 $\mu m$. Sometimes it is a skewed distribution to the right (more smaller particles). Droplet sizes can be determined, for example, using a Horiba LA, laser-based system. Bimodal distributions usually indicate poor mixing and resultant failure (oil-out) upon baking. Oil and other liquids are important to provide enough liquid to the composition to give the product the proper texture, without migrating into an associated dough portion. The weight ratio of fat to water is greater than 4:1, typically from 5:1 to 20:1, and the weight ratio of fat to sugar is greater than 1:1, e.g., from about 5:4 to about 6:1.

The fat contained within the fat phase preferably comprises a triglyceride fat and can be in any suitable physical form and from any particular source, whether animal, vegetable or synthesized. The terms fat and oil are often used interchangeably in the art, the term fat often referring to solid materials and oil to those that are liquid, but most fats useful in foods exhibit both liquid and solid components over the range of utility, so no distinction is meant herein. Fat is chosen to provide the correct amount of liquid in the formulation and may contain solid fat as well. Preferred fats have textures similar to those employed for soft (tub) margarine and can be similar in formulation to those. These fats are typically of semisolid consistency. They can comprise any of the usual vegetable oils, preferably partially hydrogenated, but can also be non-hydrogenated or fully hydrogenated oils such as soybean, safflower, sunflower, high oleic sunflower, sesame, peanut, corn, cocoa butter, olive, rice bran, babassu nut, palm, mustard seed, cottonseed, poppyseed, low erucic rapeseed, high erucic rapeseed, shea, marine, meadowfoam and the like. Synthesized and rearranged fats can also be employed. Preferred oils contain at least about 70%, preferably at least about 75% $C_{18}$ acid residues (e.g., stearic, oleic, linoleic) and comprise oils such as peanut oil, olive oil, soybean oil, canola oil, sesame oil, and corn oil, which are especially desirable for some embodiments. Low-trans oils are preferred in some cases. Less preferred are animal fats such as tallow, lard, and dairy butter. Incomplete esters and derivatives, sugar esters and waxes can also be employed in amounts consistent with the objectives of the invention.

Semisolid fats are exemplary of suitable oils, e.g., those having an SFI profile exhibiting solids contents in the following ranges:

| Temperature | Solids (%) |
|---|---|
| 50° F. | 9 to 50 |
| 70° F. | 2 to 25 |
| 92° F. | 8 maximum |

Fats of this specification have a semisolid consistency at room temperature, but essentially melt completely in the mouth. Fat substitutes, such as salatrim and olestra, can also be employed as full or partial substitutes for the fat. It is noted that, unlike olestra, salatrim is a triglyceride.

The lubricious, sweet fillers of the invention are bake-stable. One simple screening test for bake stability in fillers involves observing the extent to which the filler spreads on a sheet when heated to a given temperature. Spread is preferably maintained at less than 25%, when a teaspoonfull of the filler is dropped on a sheet of filter paper and baked at 115° C. for 10 minutes. More preferably, the spread will be less than 15%. More rigorously, spread should be less than about 1.0 cm, and preferably less than 0.8 cm, e.g., less than 0.5 cm or even 0.2 cm, when tested by the procedure set out in Example 1 of U.S. Patent Application 20020197354, which is hereby incorporated by reference in its entirety.

When the spread test is conducted with the filler placed on a filter paper as described above, the extent of "oil-out" can also be observed. Oil-out results in a ring of oil on the paper, which extends beyond the extent of the spread of the filler composition. Minimal spread and minimal oil-out are indicative of bake-stability. The oil-out should be maintained, under these conditions, to leave a ring having a diameter no more than 25% greater than the diameter of the filler after baking, and preferably no more than 15% greater than that dimension.

The process of the invention entails mixing the ingredients in a manner that provides a uniform blend having the noted, desirable textural properties. The process is exemplified below.

Baked Dough Product

The preferred aspects of the invention are directed to a dough and creamy, sweet filler composite product comprising at least one discrete region of a filler composition as described above and at least one discrete region of a dough, preferably baked to crisp texture. This enables the preparation of filled or topped baked goods such as cakes, cookies, pies, tarts, crackers, pastries, pretzels, crisps of various sizes and shapes, and the like. as noted above, the creamy fillers of the invention can include baked dough suspended in the filler, with or without casing as is desired. The term "dough", as used in this context, includes all formulations that a person skilled in the art would consider dough. At a minimum, these formulations contain a starch component and at least sufficient water to hydrate the starch, both being employed in reasonable proportions. The starch component can be provided as whole grain or grain ground or refined to any desired degree. It can be supplied in the form of flour, e.g., from wheat, barley, corn, oats, rice, rye, triticale, and the like. Or the starch component can be supplied as a purified or mechanically refined or less-than-whole-grain flour. The water can comprise water itself or an aqueous liquid such as milk (whole, skim, homogenized, buttermilk, soy), fruit or vegetable juice, and the like. Yeast or chemical leavenings are also typically present. Also typically, the dough contains shortening in an amount suitable for achieving the textural characteristics desired for a given type of product. Also typical is the use of at least some sweetener, though in limited amounts compatible with savory flavors. Sucrose and corn syrup are among the most typical. All conventional ingredients, typical for desired recipes, can be employed. For the sake of economy of description, the entire text of Manley, J. R., Technology of Biscuits, Crackers and Cookies, Vols. 1 and 2, is incorporated herein by reference for its descriptions of conventional ingredients and processing.

The doughs can be formed on any conventional equipment, including laminators, extruders, depositors, rotary formers, wire-cutters, and the like. Once a dough preform is formed, the sweet product of the invention can be applied onto or into the dough preform in any suitable manner, and the resulting composite can be baked or otherwise cooked, e.g., fried, extruder-heated, drum-heated, or the like. The invention enables the baking of the dough to a crisp texture, without degrading the sweet filling to an extent that oil migrates to the baked dough to cause textural or color problems. Also, the product does not adversely affect the crisp texture of the baked good. The sweet product can also be added to a baked good, after the dough has been partially or fully baked. The invention has the above advantages and the further advantage that the baking process is essentially the same as for the original product, adjusting only for differences in mass and geometry of the composite of dough and sweet product. Conventional baking apparatus can be employed.

In another aspect, the invention provides sweet, creamy filler compositions as described above, packaged in sealed containers, e.g., of either rigid or flexible construction. In one embodiment, a flexible plastic tube is provided for squeezing the filler product onto or into a cooked or raw food product, for eating as is or after cooking. The process of packaging is not changed from what is typically known for products of like viscosity; however, the need for very sophisticated packages, such as aerosol containers, to maintain the freshness of the product is eliminated, without reducing the convenience of the product.

The following examples are provided to further illustrate and explain preferred forms of the invention and are not to be taken as limiting in any regard. Unless otherwise indicated, all parts and percentages are by weight.

EXAMPLE 1

The following ingredients are mixed, by the procedure that follows, to form a bakeable, low-moisture caramel filling.

| Bakeable Caramel Filling | |
|---|---|
| Ingredient | % |
| Soybean oil, SHO II-Iodine Value (88–98) | 50.00 |
| Pure liquid fructose, 77% solids | 19.00 |
| Sucrose | 19.00 |
| Glycerin | 10.00 |
| Whey protein concentrate | 1.25 |
| Caramel color | 0.25 |
| Art. caramel flavor | 0.50 |
| Total | 100.00 |

-continued

Bakeable Caramel Filling

| Ingredient | % |
|---|---|
| $A_w$ @ 24° C. | 0.39 |
| Moisture | ~5–8% |

Mixing is accomplished by utilizing a Hobart mixer, equipped with a whisk, and the following procedure.

1. Heat fructose, glycerin and soybean oil to about 120° F.
2. Separate the upper layer (fat) in a second beaker after heating
3. Add lower layer (aqueous) to WPC in mixer bowl
4. Mix for 1 minute at speed 2, until gel is formed
5. Add oil gradually, within the first 5 minutes of mixing
6. Add caramel color and flavor
7. Mix for another 5 minutes at speed 2
8. While mixing for another 2 minutes, add sucrose

EXAMPLE 2

The following ingredients are mixed, by the procedure that follows, to form a bakeable, low-moisture vanilla filler.

Bakeable Vanilla Filler

| Ingredient | |
|---|---|
| Soybean oil, SHO II | 50.00 |
| Pure liquid fructose, 77% solids | 19.00 |
| Sucrose | 19.05 |
| Glycerin | 10.00 |
| Whey protein concentrate | 1.25 |
| Titanium dioxide | 0.50 |
| Creamy vanilla flavor | 0.20 |
| Total | 100.00 |
| $A_w$ @ 24.3° C. | 0.31 |
| Moisture | ~4–7% |

Mixing is accomplished by utilizing a Hobart mixer, equipped with a whisk, and the following procedure.

1. Heat fructose, glycerin and soybean oil to about 120° F.
2. Separate the upper layer (fat) in a second beaker after heating
3. Add lower layer (aqueous) to WPC, titanium dioxide and flavor in mixer bowl
4. Mix for 1 minute at speed 2, until gel is formed
5. Add oil gradually, within the first 5 minutes of mixing
6. Mix for another 3 minutes at speed 2
7. While mixing for another 2 minutes, add sucrose

EXAMPLE 3

The following ingredients are mixed, by the procedure that follows, to form a bakeable, low-moisture peanut butter filler.

Bakeable Peanut Buffer Filler

| Ingredient | % |
|---|---|
| Soybean oil, SHO II | 44.95 |
| Corn syrup, 26DE | 15.13 |
| Glycerin | 20.31 |
| Dark-roast peanut flour | 6.48 |
| Peanut buffer | 5.61 |
| Whey protein concentrate | 3.00 |
| Salt | 1.51 |
| Super Envision | 1.08 |
| Peanut flavor-raw | 1.04 |
| Titanium dioxide | 0.35 |
| Peanut flavor-roasted | 0.26 |
| Caramel color | 0.24 |
| Annatto | 0.04 |
| Total | 100.00 |
| $A_w$ @ 25° C. | 0.20 |
| % Moisture | ~3–6% |

Mixing is accomplished by utilizing a Hobart mixer, equipped with a whisk, and the following procedure.

1. Heat glycerin, corn syrup and soybean oil to about 120° F.
2. Add above to solids (WPC, salt, titanium dioxide)
3. Mix 1 minute at speed 1, until gel is formed
4. Mix 5 minutes at speed 2
5. Add flavor/colors and continue mixing for 5 more minutes at speed 2.
6. Add peanut flour and peanut butter, mix 2 minutes at speed 2

EXAMPLE 4

The following ingredients are mixed, by the procedure that follows, to form a bakeable, low-moisture cheesecake filler.

Bakeable Cheesecake Filler

| Ingredient | |
|---|---|
| Soybean oil, SHO II | 47.27 |
| Pure liquid fructose, 77% solids | 18.97 |
| Sucrose | 11.95 |
| Cream cheese powder | 9.96 |
| Glycerin | 9.96 |
| Lactic acid | 1.00 |
| Whey protein concentrate, 80% protein | 0.40 |
| Art. cheesecake flavor | 0.40 |
| Titanium dioxide | 0.10 |
| Total | 100.00 |
| $A_w$ @ 25° C. | 0.39 |
| Moisture | ~5–8% |

Mixing is accomplished by utilizing a Hobart mixer, equipped with a whisk, and the following procedure.

1. Heat fructosed, glycerin and soybean oil to about 120° F.
2. Separate upper layer (fat) in a second beaker after heating
3. Add lower layer (aqueous) to cream cheese powder, WPC and titanium dioxide in mixer bowl
4. Mix for 1 minute at speed 2, until gel is formed
5. Add oil gradually, within the first 5 minutes of mixing 6. Add lactic acid and flavor
7. Mix for another 5 minutes at speed 2
8. While mixing for another 2 minutes, add sucrose

EXAMPLE 5

The following ingredients are mixed, by the procedure that follows, to form a bakeable, low-moisture chocolate filler.

Bakeable Chocolate Filler

| Ingredient | % |
|---|---|
| Soybean oil, SHO II | 48.29 |
| Sucrose | 18.4 |
| Pure liquid fructose, 77% solids | 17.38 |
| Glycerin | 9.66 |
| Premium red dutched cocoa powder | 3.38 |
| Whey protein concentrate | 1.21 |
| Creamy vanilla flavor | 0.72 |
| Titanium dioxide | 0.48 |
| Chocolate flavor | 0.48 |
| Total | 100.00 |
| $A_w$ @ 25° C. | 0.34 |
| % Moisture | 5–8% |

Mixing is accomplished by utilizing a Hobart mixer, equipped with a whisk, and the following procedure.

1. Heat fructose, glycerin and soybean oil to about 120° F.
2. Separate upper layer (fat) in a second beaker after heating
3. Add lower layer (aqueous) to WPC, titanium dioxide and flavors in mixer bowl
4. Mix for 1 minute at speed 2, until gel is formed
5. Add oil gradually, within the first 5 minutes of mixing
6. Mix for another 3 minutes at speed 2
7. While mixing for another 2 minutes, add cocoa powder and sugar The above description is intended to enable a person skilled in the art to practice the invention. It is not intended to detail all of the possible modifications and variations, which would become apparent to the skilled worker upon reading the description. It is intended, however, that all such modifications and variations be included within the scope of the invention, which is defined by the following claims. The claims are meant to cover the indicated elements and steps in any arrangement or sequence that is effective to meet the objectives intended for the invention, unless the context specifically indicates the contrary.

What is claimed is:

1. A creamy product suitable as a filler or topping for baked goods, being bake stable and comprising:
   at least 30% by weight of a discontinuous fat portion;
   at least 20% of a continuous aqueous liquid component for providing sweetness and stability, comprising at least 15% liquid sugar and at least 9% liquid polyol, wherein the combined weight of liquid sugars and liquid polyols amounts to from 40 to 95% solids weight in the aqueous liquid component, and the continuous aqueous liquid component contains less than 30% water; and up to about 30% of an optional suspended solids portion;
   wherein the moisture content is from 2 to 10% by weight of the total composition, the weight ratio of fat to water is greater than 4:1, the weight ratio of fat to sugar is greater than 1:1, and the combined amount of the sugar, polyol and other soluble solids comprises from about 25 to 65% of the total product and is sufficient to provide an $A_w$ of less than 0.5 for the total product.

2. A creamy product according to claim 1, wherein the fat content is within the range of 35 to 65%.

3. A creamy product according to claim 1, wherein the continuous aqueous liquid component contains less than 20% water.

4. A creamy product according to claim 1, wherein the fat content is within the range of 40 to 55%.

5. A creamy product according to claim 1, wherein the weight ratio of fat to water is from 5:1 to 20 to 1.

6. A creamy product according to claim 1, wherein the weight ratio of fat to sugar is from 5:4 to 6 to 1.

7. A creamy product according to claim 1, further comprising: an optional suspended solids portion containing at least 5% by weight of the total weight of the product.

8. A composite product comprising a bakeable dough combined with a sweet, smooth-textured and shelf-stable product as defined in claim 1.

9. A process for preparing a product as defined in claim 8, comprising forming a composite product, by providing at least one discrete region of a filling as described in claim 1 above, on or in at least one discrete region of a dough, and baking the composite product to provide a baked portion having a crisp texture and a filler that retains a smooth, creamy texture.

10. A composite product comprising with a sweet, smooth-textured and shelf-stable product as defined in claim 1 having discrete pieces of baked dough suspended therein.

11. A process for preparing a product as defined in claim 10, comprising forming a composite product, by combining at least one discrete region of a filling as described in claim 1 above, with at least one discrete region of a baked dough, to provide a baked portion having a crisp texture and a filler that retains a smooth, creamy texture.

12. A sweet product as described in claim 10 above, packaged in a sealed container.

13. A creamy product suitable as a filler or topping for baked goods, being bake stable and comprising:
   at least 30% by weight of a discontinuous fat portion;
   at least 20% of a continuous aqueous liquid component for providing sweetness and stability, comprising at least 15% liquid sugar and at least 9% liquid polyol, wherein the combined weight of liquid sugars and liquid polyols amounts to from 40 to 95% solids weight in the aqueous liquid component, and the continuous aqueous liquid component contains less than 30% water; and up to about 30% of an optional suspended solids portion;
   wherein the moisture content is from 2 to 10% by weight of the total composition, the fat content is from 35 to 65% by weight of the total composition, the weight ratio of fat to water is greater than 4:1, the weight ratio of fat to sugar is greater than 1:1, and the combined amount of the sugar, polyol and other soluble solids comprises from about 25 to 65% of the total product and is sufficient to provide an $A_w$ of less than 0.5 for the total product.

14. A creamy product according to claim 13, wherein the continuous aqueous liquid component contains less than 20% water.

15. A creamy product according to claim 13, wherein the fat content is within the range of 40 to 55% and the weight ratio of fat to water is from 5:1 to 20 to 1.

16. A creamy product according to claim 13, wherein the weight ratio of fat to sugar is from 5:4 to 6 to 1.

17. A creamy product suitable as a filler or topping for baked goods, being bake stable and comprising:
- at least 30% by weight of a discontinuous fat portion;
- at least 20% of a continuous aqueous liquid component for providing sweetness and stability, comprising at least 15% liquid sugar and at least 9% liquid polyol, wherein the combined weight of liquid sugars and liquid polyols amounts to from 40 to 95% solids weight in the aqueous liquid component, and the continuous aqueous liquid component contains less than 30% water; and up to about 30% of an optional suspended solids portion;
- wherein the moisture content is from 2 to 10% by weight of the total composition, the fat content is from 35 to 65% by weight of the total composition, the weight ratio of fat to water is from 5:1 to 20 to 1, the weight ratio of fat to sugar is from 5:4 to 6 to 1, and the combined amount of the sugar, polyol and other soluble solids comprises from about 25 to 65% of the total product and is sufficient to provide an $A_w$ of less than 0.5 for the total product.

18. A creamy product according to claim 17, further comprising: an optional suspended solids portion containing at least 5% by weight of the total weight of the product.

19. A composite product comprising a bakeable dough combined with a sweet, smooth-textured and shelf-stable product as defined in claim 1.

20. A process for preparing a composite product by combining at least one discrete region of a filling as described in claim 19 above, with at least one discrete region of a baked dough, to provide a baked portion having a crisp texture and a filler that retains a smooth, creamy texture.

21. A process for preparing a composite product by combining at least one discrete region of a filling as described in claim 19 above, with at least one discrete region of a unbaked dough and baking, to provide a baked portion having a crisp texture and a filler that retains a smooth, creamy texture.

22. A product of the process of claim 21.

* * * * *